Patented Oct. 5, 1926.

1,601,772

UNITED STATES PATENT OFFICE.

ROBERT RUSSELL, OF HEATON PARK, AND HERBERT BROOMFIELD, OF STOCKPORT, ENGLAND, ASSIGNORS TO LATEX DEVELOPMENTS LIMITED, OF LONDON, ENGLAND, A CORPORATION OF GREAT BRITAIN.

MANUFACTURE OF RUBBER COMPOUNDS.

No Drawing. Application filed February 6, 1925, Serial No. 7,392, and in Great Britain February 26, 1924.

This invention relates to the manufacture of rubber compounds and has for its main object a process for the production of a solid, spongy, non-adhesive material suitable for use as an ingredient in so-called "rubber-mixings".

In accordance with this invention heated rubber latex and a heated aqueous solution of glue, gelatine or the like are mixed and both the latex and the glue are then coagulated. In the case of glue, the coagulation might be more correctly termed hardening or solidifying.

Preferably the latex and the glue or like solution are each heated to about 90° C., mixed, and then raised to about 100° C., after which are added the coagulants which may have been mixed previously, but the coagulants may be added to the mixture prior to raising the temperature from 90° C. to 100° C.

The coagulants employed may be formaldehyde and acetic acid, the former serving to coagulate the glue whilst the latter serves to coagulate the latex. Other glue coagulants may be used, for example, tannic acid and the like; similarly other acids may also be used for coagulating the latex.

According to one form of this invention rubber latex at its normal concentration of about 33⅓% of rubber, by weight, is heated to about 90° C. in a, preferably, closed glass, porcelain or like vessel, immersed in a water bath and about 1% to 3%, by volume, of an alkali such as liquid ammonia (S. G.—.880) is added thereto and the mixture is stirred. At the same time an aqueous solution of glue, at a concentration of about 85% of glue, by weight, (but in some cases it may be so low as 60% of glue, by weight) is heated to about 90° C. in a glass, porcelain or like vessel, immersed in a water bath, and when it has liquefied, about 1% to 8%, by volume, of an alkali, such as liquid ammonia (S. G.—.880), is added thereto and stirred into it. It is to be observed that it is desirable that the ammonia should be added to the solution of glue as late as possible to avoid waste by evaporation and to avoid any deleterious action on the glue through prolonged heating in the presence of the alkali.

The heated latex and heated solution of glue, in about equal proportions, by volume, are then mixed in a glass, porcelain or like vessel, immersed in a water bath, and stirred, the temperature of the mixture is raised to about 100° C. and a mixture of formaldehyde of about 40% concentration and glacial acetic acid, in the proportion of 5 parts to one by volume, is added and stirred in, whereupon coagulation of the latex and glue take place rapidly. The product obtained by the process is solid, insoluble in water, and can be immediately ground and packed; moreover, it is not affected by damp and does not become sticky.

In most cases the proportions of latex and glue will be equal, by volume, but for certain purposes, the proportions may be varied within wide limits.

For use in "rubber-mixings" the solid, spongy, non-adhesive product of this process may be ground or otherwise disintegrated, and in order to enable said product to be kept for a considerable time without losing its mellowness, there may be added to either the latex or the glue solution before they are mixed, about 2% to 20%, by volume, of a vegetable or mineral oil or jelly such as linseed oil, castor oil, petroleum jelly or like petroleum product, or about 1% to 10% thereof, by volume, may be added to the mixture of latex and glue solution before the mixture of coagulants is added, or the same result may be attained by the addition of a similar quantity of treacle, glucose, glycerine or the like. When the latex and glue are not in equal volumes, the quantity of vegetable or mineral oil or jelly will be varied accordingly.

Organic or inorganic fillers may be added to the glue solution before it is added to the latex, or the fillers may be added to the mixture before coagulation, the fillers being previously wetted to prevent premature coagulation. In this connection it may be pointed out that the addition of the fillers should be disregarded in proportioning the volume of latex and glue.

When in our claims we speak of glue we intend to have such word construed as meaning also gelatine or the like as hereinabove specified.

We claim:—

1. A solid, insoluble, spongy, non-adhesive material, suitable as an ingredient of rubber mixings, consisting of a mixture of coagulated latex and coagulated glue substantially as and for the purpose described.

2. The process of making a solid, insoluble, spongy, non-adhesive material suitable as an ingredient of rubber mixings, which comprises subjecting a mixture of latex, an alkaline solution of glue, a latex coagulant and a glue coagulant to a temperature of about 100° C. until the ingredients have been coagulated, substantially as and for the purpose described.

ROBERT RUSSELL.
HERBERT BROOMFIELD.